United States Patent [19]
McCabe et al.

[11] 4,304,136
[45] Dec. 8, 1981

[54] ELECTRICAL TRANSDUCER RESPONSIVE TO FLUID FLOW

[75] Inventors: Garry-Owen McCabe, New Hartford; William P. Milish, Bristol, both of Conn.

[73] Assignee: Transamerica DeLaval Inc., Princeton, N.J.

[21] Appl. No.: 117,791

[22] Filed: Feb. 1, 1980

[51] Int. Cl.³ .............................................. G01F 1/24
[52] U.S. Cl. ............................................... 73/861.54
[58] Field of Search ......................... 73/861.53, 861.54

[56] References Cited
U.S. PATENT DOCUMENTS

| | | | |
|---|---|---|---|
| 1,274,642 | 8/1918 | Wagner et al. | 73/861.54 |
| 2,069,309 | 2/1937 | Henszey | 73/861.54 |
| 2,640,356 | 6/1953 | Shannon | 73/861.54 |
| 3,528,288 | 9/1970 | Scourtes | 73/861.54 |
| 3,744,313 | 7/1973 | Thompson | 73/861.54 |
| 4,194,394 | 3/1980 | Bartholomaus | 73/861.54 |

Primary Examiner—Herbert Goldstein
Attorney, Agent, or Firm—Hopgood, Calimafde, Kalil, Blaustein & Judlowe

[57] ABSTRACT

The invention in a preferred form contemplates a valve-like structure adapted for series-connection in a pipe or other conduit line and having a valve member which is caused, within the constraint of a rectilineal guide, to change its longitudinal position as a substantially linear function of the change of fluid-flow rate in the pipe or conduit; and an inductive device tracks the position of the valve member to produce an electrical output signal which is also a substantially linear function of the fluid-flow rate. The description includes a unidirectional embodiment (which is also a check valve for flow in the non-metering direction), and a bi-directional embodiment.

7 Claims, 9 Drawing Figures

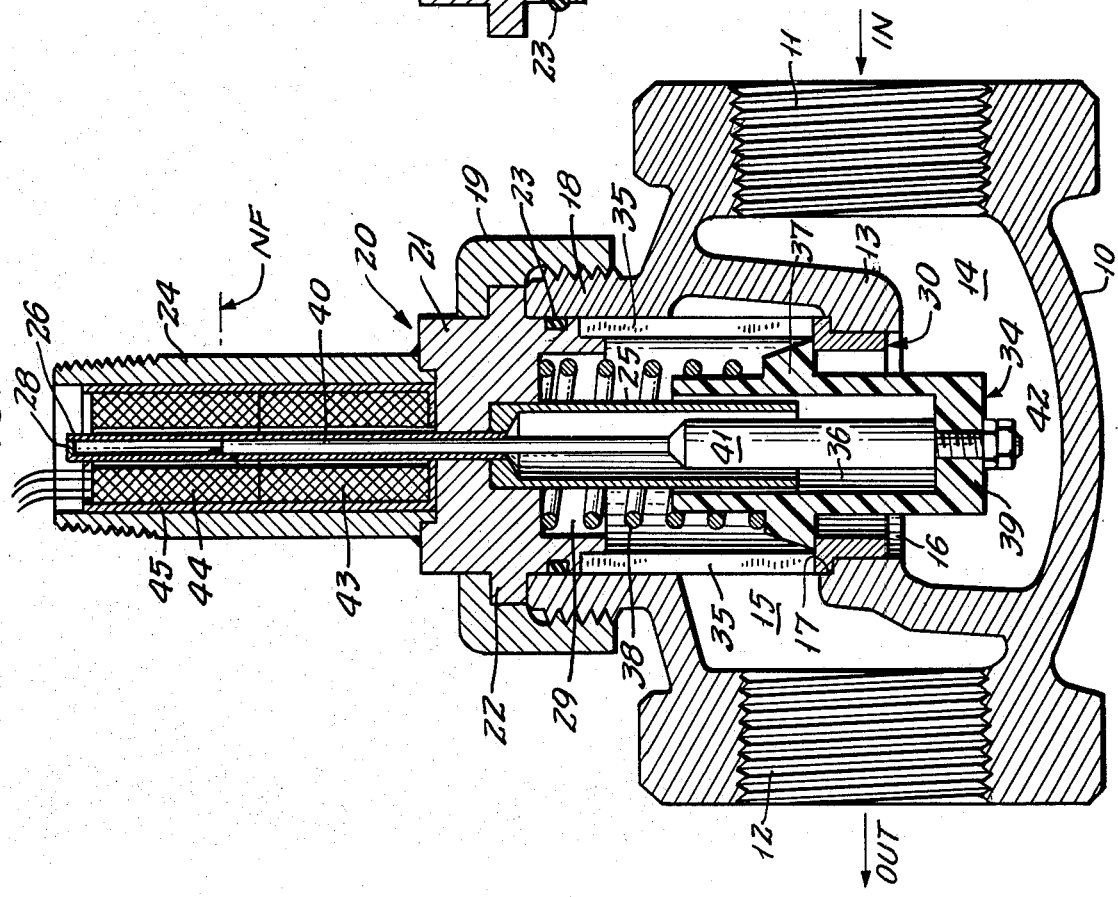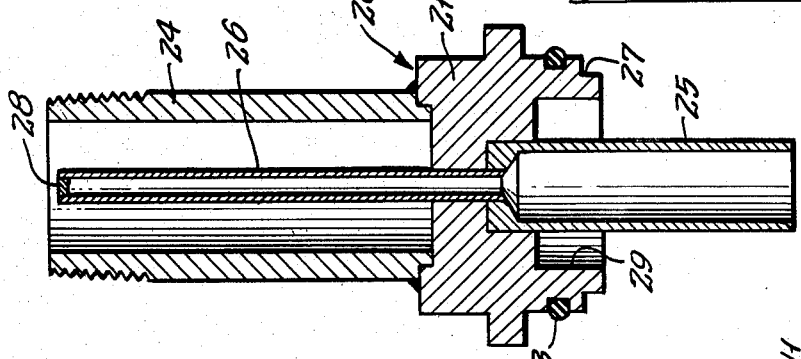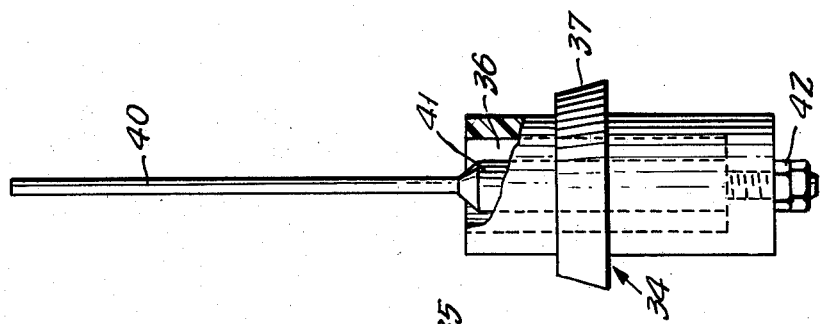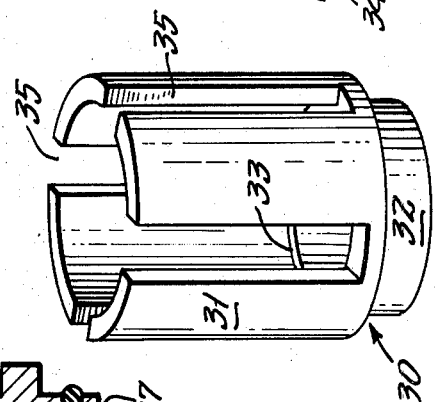

ELECTRICAL TRANSDUCER RESPONSIVE TO FLUID FLOW

BACKGROUND OF THE INVENTION

The invention relates to fluid-flow responsive devices which produce an electrical output in response to such flow.

So far as we are aware, past devices of the character indicated employ a valve-member element which is displaced in response to fluid flow, and a predetermined displacement is monitored by an on/off electrical element, such as a magnetic-reed switch. Such devices are exemplified by U.S. Pat. Nos. 2,892,051 and 4,081,635. Necessarily, such devices are limited as indicators of the onset or existence of a pre-specified flow rate, and the only way to obtain response to more than one flow rate is to employ more than one magnetic switch, at one or more further locations selected to be measures of the respective further flow rates for which electrical response is desired. At best, only a step-function response is achievable, and a hysteresis factor is present to preclude identity as between the electrical response to increasing flow-rate conditions, when compared to the electrical response to decreasing flow-rate conditions.

BRIEF STATEMENT OF THE INVENTION

It is an object of the invention to provide an improved flow-rate responsive device of the character indicated, avoiding deficiencies and limitations of past devices.

Another object is to provide such a device which will produce a substantially linear electrical response to fluid-flow rate.

A further object is to provide such a device with optional adaptability to flow measurement in one direction and a flow measurement in either of two directions.

A specific object is to provide such a device essentially as an optional insert subassembly adapted for incorporation in existing or standard valve-body configurations.

Another specific object is to meet the immediately preceding object with a structure wherein the insert subassembly is one of a plurality of subassemblies, each unique to a different range of flow rates, so that the same body can be readily equipped or serviced to serve a selected or changed variety of flow rates, without body disconnection from existing pipe or conduit means.

Another object is to meet the foregoing objects with structure which is inherently simple and essentially hysteresis-free, and which is characterized by reliable performance and ease of maintenance.

The foregoing and other objects and features of the invention are achieved in a valve-like structure adapted for series-connection in a pipe or other conduit line and having a valve member which is caused, within the constraint of rectilineal guide means, to change its longitudinal position as a substantially linear function of the change of fluid-flow rate in the pipe or conduit. An inductive device tracks the position of the valve member to produce an electrical output signal which is also a substantially linear function of the fluid-flow rate. In a first illustrative embodiment, the indicated structure and function are incorporated into a check valve, wherein the flow-monitoring direction is in the "flow" direction of the check valve. In a second embodiment, the indicated feature is operative whatever the direction of flow, and the electrical output signal is indicative of both the direction and the rate of flow.

DETAILED DESCRIPTION

Illustrative embodiments of the invention will be described in conjunction with the accompanying drawings, in which:

FIG. 1 is a vertical sectional view through a fluid-flow device of the invention, wherein flow is monitored only in the flow direction right-to-left, in the sense of the sectional view;

FIG. 2 is a vertical sectional view through the bonnet assembly, being part of the device of FIG. 1;

FIG. 3 is a perspective view of a body-mounted part of the device of FIG. 1;

FIG. 4 is a view in elevation, alongside and to the scale of FIG. 2, of the flow-displaceable subassembly, being another part of the device FIG. 1;

Figure 5:
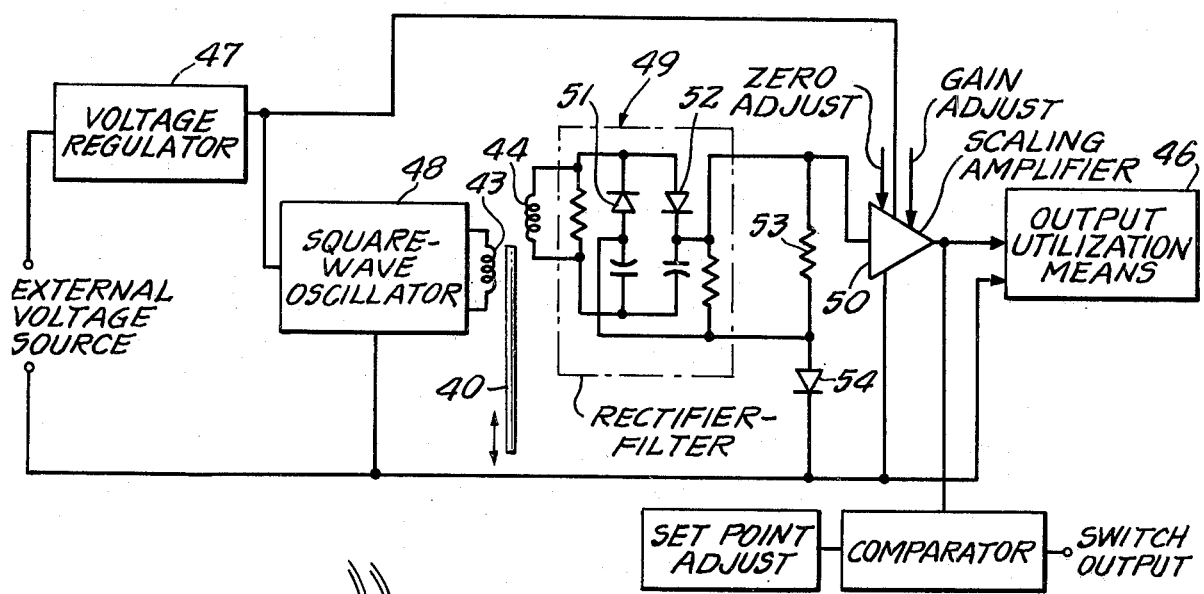
FIG. 5 is an electrical block diagram, schematically showing electrical components associated with the device of FIG. 1.

In FIG. 1, the invention is shown in application to a conventional valve body 10, which is generally a metal casting having an inlet port 11 and an outlet port 12, both shown with threads as for standard-pipe connection thereto. Within body 10, a bridge 13 divides the interior volume into an upstream chamber 14 served by inlet port 11 and a downstream chamber 15 served by outlet port 12. The central part of bridge 13 is generally horizontal, at substantially the elevation of the axis common to ports 11–12, and a seat bore 16 with a counterbore 17 at its upper end is formed in the central part of bridge 13, on a vertical alignment which preferably intersects the horizontal alignment of ports 11–12.

The body 10 includes an upstanding boss portion 18 having a straight cylindrical bore to the downstream chamber 15 and on the same vertical-alignment axis as that of bore 16 and counterbore 17, and a bonnet-clamp nut 19 engages the threads of boss 18. A bonnet assembly 20 includes a circular base 21 having a radially outward flange 22 which seats on the open end of boss portion 18 and which is clamped in place upon threaded advance of nut 19 on boss 18. An elastomeric O-ring 23, retained in a peripheral groove beneath flange 22, seals the bonnet assembly 20 to the bore of boss 18 when flange 22 is clamped as described. The bonnet assembly is best seen in FIG. 2 and further includes an upstanding cylindrical conduit boss 24 for threaded-fitting connection to standard electrical conduit (not shown), boss 24 being brazed in its connection to base 21, as suggested by a circumferential fillet in the drawing. From a central bore of base 21, a tubular stem 25 extends downwardly, and another tubular member or sleeve 26 extends upwardly, for substantially the longitudinal extent of the conduit boss 24; as shown, the upper or base end of stem 25 is closed except for a central bore to which the lower end of sleeve 26 is fitted, and the upper end of sleeve 26 is permanently closed by a plug 28. The parts 25, 26, 28 are preferably sealed at their fit to each other and constitute a stem subassembly which is then assembled to and sealed at its fit to a counterbore of base 21. Thus, when the bonnet assembly 20 is clamped by the bonnet nut 19, the bonnet assembly 20 constitutes a fluid-tight sealed closure of the bore of boss 18.

Description of the bonnet-assembly 20 is completed by noting a downwardly open counterbore 29 for spring-locating purposes to be described, and by noting that the sleeve 26 is of non-magnetic material, such as thin stainless-steel tubing, for purposes which will become clear.

When the bonnet assembly 20 is clamped in place, as described, a calibrating seat member 30 is retained in place. Seat member 30 is seen in FIG. 3 to be essentially a sleeve with a large-diameter elongate upper end portion 31 and a reduced lower end portion 32. The lower-end portion 32 locates in the bridge or seat bore 16, and the base end of the upper-end portion 31 locates in the adjacent counterbore 17; and the upper end of portion 31 locates on the reduced and shouldered end 27 of the bonnet base 21. At juncture of portions 31–32, and within portion 31, an annular seating surface 33 is defined, to provide a bottom-stop and valve closing function, in cooperation with a valve member or shuttle 34, to be later described; and upward from the plane of surface 33, the upper-end portion 31 is characterized by plural slots 35, of preferably constant width, unless a particularly characterized valve action is desired, in which case slot (35) width varies as a function of axial elevation to accord with the desired characteristic.

The valve member or shuttle 34 is essentially an elongate cup, having a bore 36 which derives longitudinally slidable guidance from telescoping overlap with the bonnet stem 25. An integrally formed circumferential flange 37 characterizes the longitudinally central portion of shuttle 34 and is of outside diameter to radially clear the bore of seat member 30 (at 31) but nevertheless large enough for assurance of circumferentially continuous seating overlap with surface 33, for a zero-flow condition; and a relatively weak coil spring 38 is shown seated in the bonnet counterbore 29 and continuously urging shuttle 34 to its seated position. The lower end of shuttle 34 extends substantially below the seating flange 37 and has a closure wall 39 by which it is connected to means for tracking the instantaneous position of shuttle 34. The latter connection establishes a longitudinally positionable subassembly, best shown in FIG. 4.

In FIG. 4, the movable subassembly is seen to comprise an elongate core element or rod 40, of high magnetic permeability, secured at one end, by silver brazing of the bored upper end of a connecting rod 41, of non-magnetic material such as brass. Rod 41 has a reduced end which is threaded and projects with radial clearance through a central hole in the shuttle wall 39, to enable axially secure fastening, via lock nuts 42, with a measure of freedom for self-alignment adaptability for rod 40 in stem 26. The core element 40 is slidably positionable within sleeve 26, and when shuttle 34 is seated at 37–33, the upper end of the core element 40 is at the elevation denoted N.F. in FIG. 1, meaning the no-flow condition. When in this position, core element 40 is totally lapped with a first (43) of two like coils 43–44; in this position, core element 40 is also partially lapped with the second coil 44, as shown. Coils 43–44 are shown fitting in end-to-end abutting relation within a cup-shaped coil shield 45, in telescoped overlap with the sleeve 26, and all fully contained within the cylindrical inner volume of the conduit boss 24 of the bonnet assembly 20. Leads to respective coils 43–44 are shown extending through the open end of conduit boss 24, for wire-nut or other wiring connection to external electrical components of the electrical circuit.

The coils 43–44 and core element 40 are operative components of a linearly variable differential transformer (L.V.D.T.) wherein the coil 43 is the primary and is therefore continuously excited, at constant voltage. As long as the shuttle 34 remains seated, the upper end of core element 40 remains at the elevation N.F. and therefore provides substantially no coupling to coil 44. However, with upward shuttle displacement, core element 40 becomes progressively more linked to the secondary coil 44, while remaining fully linked to the primary coil 43. Thus, the amplitude of secondary voltage becomes a direct linear measure of the extent of coupling of core element 40 to the upper coil 44.

We have obtained reliable operation using a core element 40 of high-permeability material, which is either Allegheny-Ludlum alloy #4750 or Carpenter #49-FM, and which has been machined to cylindrical shape, 2.25 inches long, by 0.01-inch diameter, the same having been annealed in a dry-hydrogen atmosphere, after machining. Each of the coils was one-inch long, being 5700 turns of #42 enameled copper wire; and the shield 45 has been of Mu-metal per AMS-7701, also hydrogen-annealed for optimum magnetic properties.

FIG. 5 is illustrative of a battery-operated circuit for providing output-utilization means 46, such as an indicating meter or recorder, with a d-c voltage, say in the range 0 to 10 volts, and having an amplitude which is a linear function of the displaced condition of core element 40 with respect to its seated (N.F.) position. In this circuit, a voltage regulator 47 having a 12-volt output enables the L.V.D.T. device to operate from an unregulated source or any convenient voltage, say in the range of 15 to 30 volts d-c. The output of regulator 47 supplies a square-wave oscillator 48, which may be of a solid-state switch to chop the regulated voltage at, say, 800 Hz nominal frequency, the chopped voltage being applied directly to the lower or primary coil 43. The voltage induced in the upper or secondary coil 44 is full-wave rectified and filtered at 49, and the filtered output is processed in a scaling amplifier 50, for delivery to the output means 46.

By judicious choice of oscillator frequency, a reasonable square wave will be obtained across the secondary coil 43. Such a waveform enables the rectifier-filter 49 to tolerate moderate distortion due to frequency drift and changes in core position.

It is desirable to use a simple rectifier-filter circuit, using Schottky-type diodes 51–52, such as the common full-wave voltage doubler. However, this entails a voltage drop across the rectifier diodes 51–52, when conducting, that is significant compared to the filtered d-c voltage, here shown appearing across a resistor 53. Since the rectifier voltage drop is temperature-sensitive, the filtered d-c voltage is temperature-sensitive to an unacceptable extent. However, the voltage drop across a rectifier diode at constant current is predictable; it decreases linearly with increasing temperature. This being the case, and for a given displacement condition of core element 40, the filtered d-c voltage which appears across resistor 53 will, in the absence of other considerations, increase with increasing temperature. We offset this temperature-dependence by so connecting another diode 54 that its voltage drop will be summed with the filtered d-c voltage across resistor 53, and it is therefore the voltage sum across 53-54 which is supplied for processing at amplifier 50. Since this summation takes place prior to the gain stage (50), the temperature compensation is independent of such gain adjustments as may be provided at 50.

The amplifier circuit 50 may use a commercially available integrated-circuit operational amplifier, for example, the RCA product coded CA3130.

The circuit configuration is chosen (a) to offer negligible loading to the rectifier-filter 49, (b) to amplify the temperature-compensated d-c signal, and (c) to provide adjustability of zero balance and gain; preferably, the amplifier is of the type known as a "follower with gain". Such an amplifier is preferred because its output is stable with temperature, due to the large amount of negative feedback inherent in the circuit. Amplifier drift is essentially equal to the magnitude of drift in the associated resistive components (not shown), which can be made small by choice of components.

In operation, fluid flow in the inlet-to-outlet direction will cause upward displacement of shuttle 34, from its no-flow seated relation to the annular surface 33. The flange 37 is preferably of tapering external contour, so that the effective flow orifice will be determined essentially only by the lower edge of flange 37 with respect to the sum of the then-open extents of the slots 35. Such upward displacement is therefore essentially a linear reflection of instantaneous flow rate, and it has been explained that the electrical output to means 46 is likewise essentially a linear reflection of the upward displacement and is, therefore, also a linear reflection of instantaneous flow rate.

Figure 6:
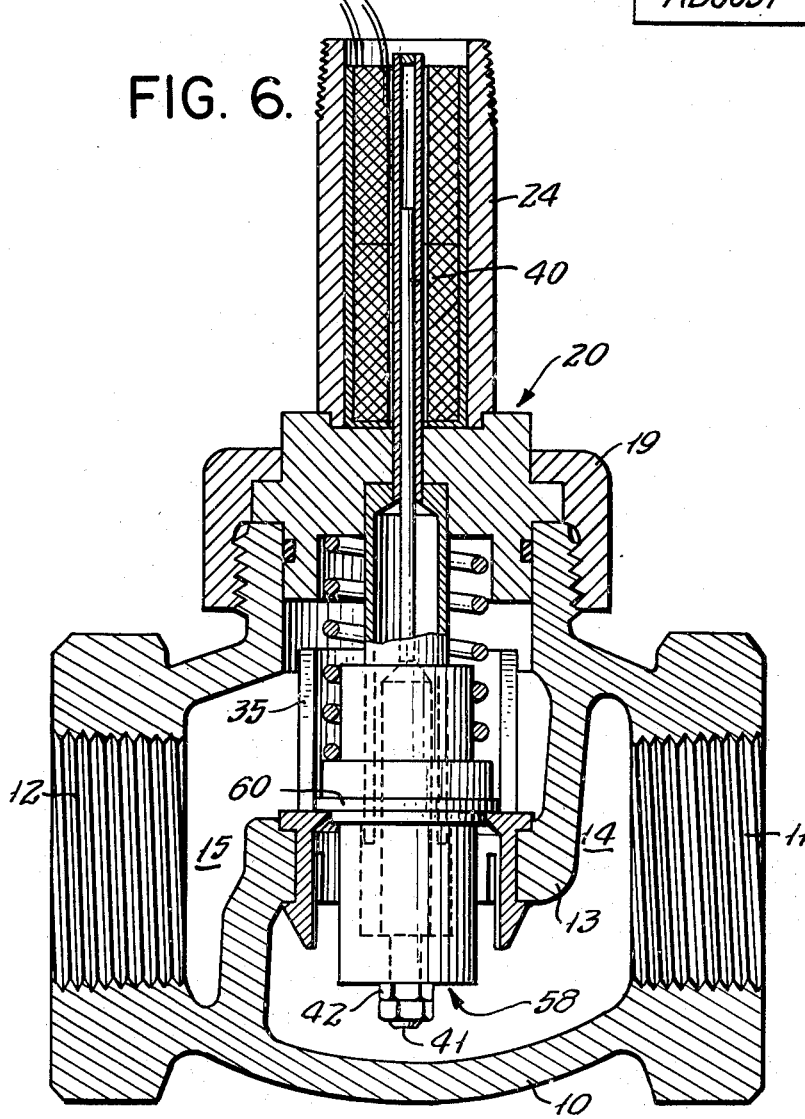
FIG. 6 is a view similar to FIG. 1, to show an alternative construction.
Figure 7:
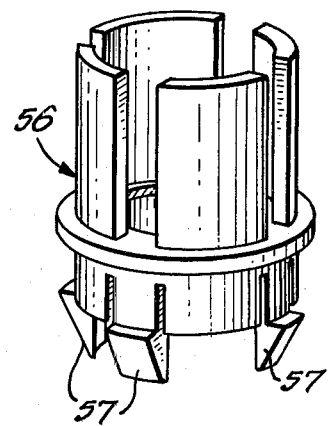
FIG. 7 is a perspective view of a body-mountable part of the device of FIG. 6.

FIG. 6 illustrates a modification of the device of FIG. 1, wherein the calibrating seat member 56 is configurated for snap-in retention by the seat bridge 13 of the valve body, thus avoiding the need for upper-end stabilization by abutment with bonnet structure. As best seen in FIG. 7, the seat member incorporates plural spring fingers 57 at angularly spaced locations, said fingers having cam-sloped surfaces to cause transient inward deflection in the course of insertion into the seat bore 16 and counterbore 17; at achievement of full insertion, locking barb abutments of fingers 57 snap outwardly into retaining engagement with the bottom surface of bridge 13, at bore 16. Within the seat member 56, a shuttle or valve member 58 may be as described at 34, but in the form shown shuttle 58 has a generally cylindrical body, stepped only by a radially short flange 59 to provide a shoulder for coaction with spring 38, the valve-member coaction with the flow-calibrating slots of seat member 56 being via a relatively thin annular disc 60, secured as by snap-ring means against the lower shoulder of flange 59. To achieve the snap-action retention described via fingers 57, the seat member 56 is desirably a single injection-molded part, as of polypropylene or Delrin. It will be appreciated that such snap action facilitates application of the invention to existing, installed valve bodies, and that for greatest flexibility of such use, the reduced threaded end of connecting rod 41 is preferably even more extensive than depicted in FIG. 3, to enable a greater range of ultimate accommodation of the N.F. location of core element 40, for the particular valve-body dimensions which happen to apply.

The arrangements thus far discussed have involved what is essentially a check valve, accommodating flow only in the inlet-to-outlet direction, being the flow-measuring direction. The arrangement of FIG. 8 illustrates that the invention is also applicable to measurement of flow in either of the two possible directions (11-to-12, or 12-to-11), with an indication of which of these directions is currently applicable.

Figure 8:
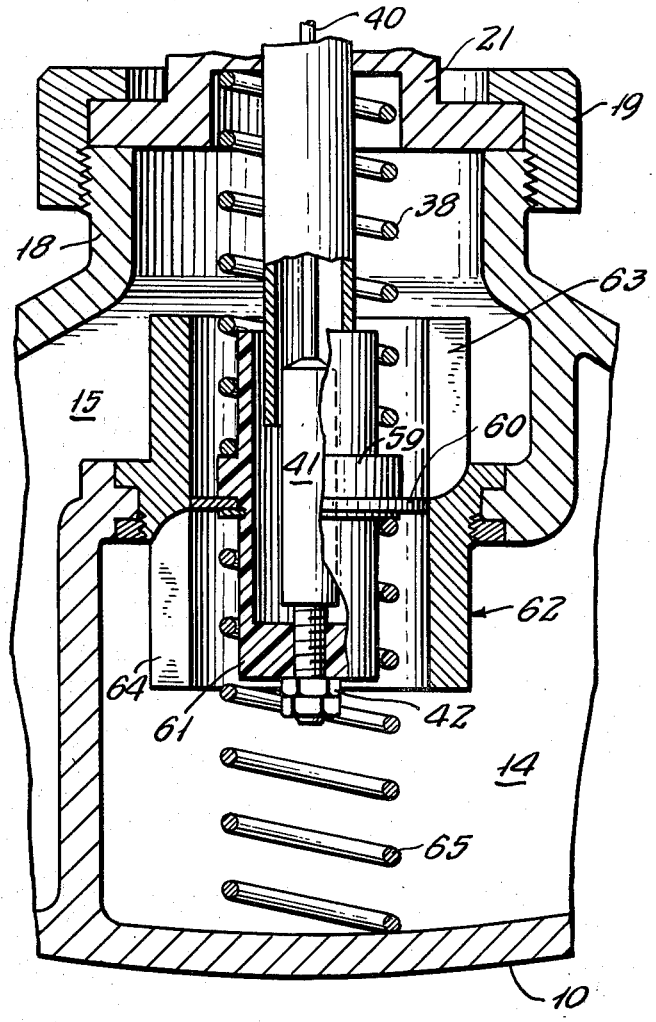
FIG. 8 is a view similar to FIG. 1, to show a further embodiment, with inherent capability to monitor flow in either of two possible directions of flow.
Figure 9:
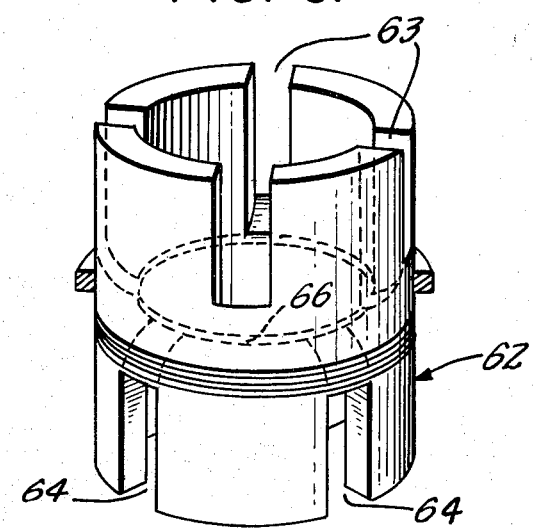
FIG. 9 is a perspective view of a body-mountable part of the device of FIG. 8.

In FIG. 8, a calibrating seat member 62 is characterized by a continuous cylindrical bore which extends above and below a central no-flow zone of coaction with a valve-member disc 60. Inlet-to-outlet flow will elevate the associated shuttle 61 and its disc 60 to expose orifices provided by an upper series of calibration slots 63, and outlet-to-inlet flow will depress the shuttle and its disc 60 to expose orifices provided by a lower series of calibration slots 64, shown in FIG. 9 to be in angularly staggered interlace with the slots 63. A second relatively weak spring 65 reacts with the shuttle in opposition to spring 38 to assure a nominal force for valve-member placement in the central or no-flow zone 66 of seat member 62, in the absence of any flow, it being understood that said zone 66 is of relatively short axial extent (axially between slots 63 and 64), corresponding to substantially the effective axial thickness of the rim of disc 60.

To utilize the described L.V.D.T. coils 43-44 in the bidirectional system of FIG. 8, the core element 40 is so adjusted in its connection to the valve-member shuttle that when disc 69 is in the no-flow zone of seat member 62, the upper end of core element 40 is in a mid-position of coupling to the secondary coil 44. In that case, it will be understood that, without any circuit modification, (a) output of amplifier 50 may at a no-flow level be a fixed intermediate voltage (e.g., 5 volts d-c), that (b) for inlet-to-outlet flows, the output voltage at 50 may be in the range 5 to 10 volts, and that (c) for reversed flow (outlet-to-inlet) the output voltage at 50 may be in the range 10 to 5 volts. Of course, it will be further understood that with suitable provision for a constant 5-volt negative offset in conjunction with the output of amplifier 50, the voltage supplied to means 46 may be 0 to 5 volts positive for inlet-to-outlet flows, and 0 to 5 volts negative for outlet-to-inlet flows. In either event, the direction and the magnitude of the fluid flow is reported to means 46 via the output voltage from amplifier 50.

What is claimed is:

1. A fluid-flow responsive electric transducer, comprising a valve body having a fluid passage between an inlet and an outlet, said body including seat structure having a circular valve opening and dividing said passage into an inlet chamber and an outlet chamber, a tubular guide member carried by said seat at said opening and having a portion extending into said outlet chamber, said tubular guide member also having a cylindrical portion sized to fit the seat opening and a radial shoulder adapted to engage said seat structure and thus to limit cylindrical-portion entry into the seat opening, a piston member slidably displaceable within said guide member, the outlet-chamber portion of said guide member having an elongate slot of predetermined flow-characterizing width, whereby over the slotted region, said piston member will be longitudinally displaced as a substantially linear function of rate of flow for a given fluid in said passage, and electrical transducer means including a part connected to said piston and a part mounted to said body and producing an electrical output signal having a varying parameter which is a substantially linear function of piston displacement, said tubular guide member being a single piece of injection-molded plastic integrally including at its mounting end a compliantly displaceable latch formation having snap-lock engagement with the inlet-chamber side of said seat structure to retain its inserted assembly, whereby said tubular guide member may be a selectable one of a plurality of different flow-capacity tubular members securable with snap-action to said seat structure, depending upon the desired one of a plurality of operating ranges achievable with otherwise the same transducer.

2. The transducer of claim 1, in which said piston member has a cylindrical periphery at the radially inward limit of a radial flange, and a washer sized for piloting engagement along the inner surface of the slotted region of said guide member, said washer having an opening to fit said cylindrical periphery when abutted to said flange, and means to retain such abutment.

3. The transducer of claim 2, in which said cylindrical portion is intermediate said flange and a radial outwardly open groove in said piston member.

4. A fluid-flow responsive electric transducer, comprising a valve body having a fluid passage between an inlet and an outlet, said body including seat structure having a valve opening and dividing said passage into an inlet chamber and an outlet chamber, a tubular guide member carried by said seat at said opening and having a portion extending into said outlet chamber, said tubular guide member having a bore of constant section extending through and determining the maximum effective seat opening, said guide member and bore section extending continuously into each of said chambers, a piston member slidably displaceable within said guide member, the outlet-chamber portion of said guide member having an elongate slot of predetermined flow-characterizing width, the inlet-chamber portion of said guide member having an elongate slot of predetermined flow-characterizing width, said inlet-chamber slot being at angular offset with respect to said outlet-chamber slot, and both said slots terminating substantially at the region of seat mounting, whereby over the slotted regions, said piston member will be longitudinally displaced as a substantially linear function of rate of flow for a given fluid in said passage, and electrical transducer means including a part connected to said piston and a part mounted to said body and producing an electrical output signal having a varying parameter which is a substantially linear function of piston displacement.

5. The transducer of claim 4, in which said outlet-chamber slot is one of a plurality of angularly spaced slots of constant width and in first longitudinal register, in which said inlet-chamber slot is one of a corresponding plurality of angularly spaced elongate slots of constant width and in second longitudinal register, the slots of said pluralities being at angularly staggered interlaced alignments.

6. The transducer of claim 5, in which the body-mounted part of said electrical-transducer means includes two like elongate multi-turn coils in longitudinal adjacency on the alignment of piston guidance, and in which the piston-connected part of said electrical-transducer means includes an elongate core of high magnetic-permeability material and of substantially constant section displaceable within said coils, the effective longitudinal extent of said core and of each of said coils being substantially the same, said core being in equally divided partial overlap with both said coils when said piston member is at the region of seat mounting and therefore at substantial cut-off of both inlet-chamber and outlet-chamber slots.

7. A fluid-flow responsive electric transducer, comprising a valve body having a fluid passage between an inlet and an outlet, said body including seat structure having a valve opening and dividing said passage into an inlet chamber and an outlet chamber, a tubular guide member carried by said seat at said opening and having a portion extending into said outlet chamber, a piston member slidably displaceable within said guide member, the outlet-chamber portion of said guide member having an elongate slot of predetermined flow-characterizing width, whereby over the slotted region, said piston member will be longitudinally displaced as a substantially linear function of rate of flow for a given fluid in said passage, and electrical transducer means including a part connected to said piston and a part mounted to said body and producing an electrical output signal having a varying parameter which is a substantially linear function of piston displacement, the body-mounted part of said electrical-transducer means including two like elongate multi-turn coils in longitudinal adjacency on the alignment of piston guidance, the piston-connected part of said electrical-transducer means including an elongate core of high magnetic-permeability material and of substantially constant section displaceable within said coils, the effective longitudinal extent of said core and of each of said coils being substantially the same, and a square-wave oscillating source connected to excite one to the exclusion of the other of said coils, and piston-displacement detector means including a rectifier connected to the other to the exclusion of said one coil.

* * * * *